E. R. MATHEWS.
PIPE WRENCH.
No. 189,567. Patented April 17, 1877.
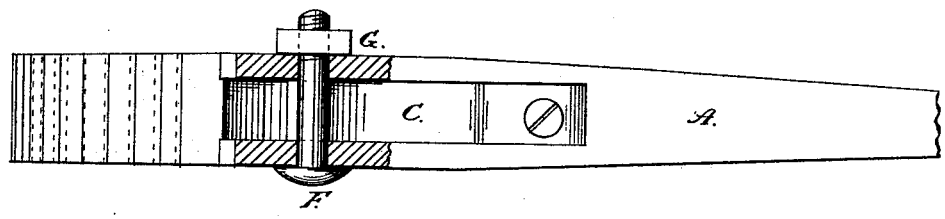
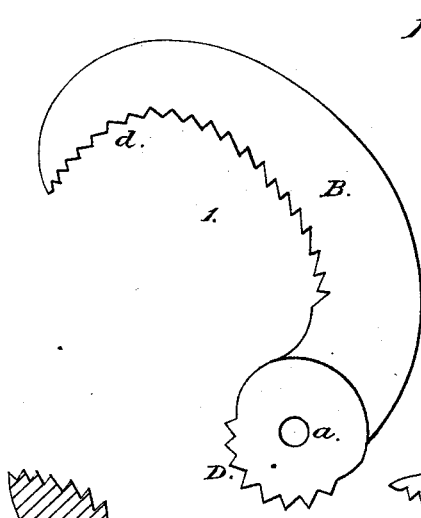
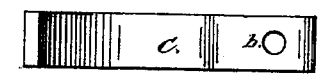
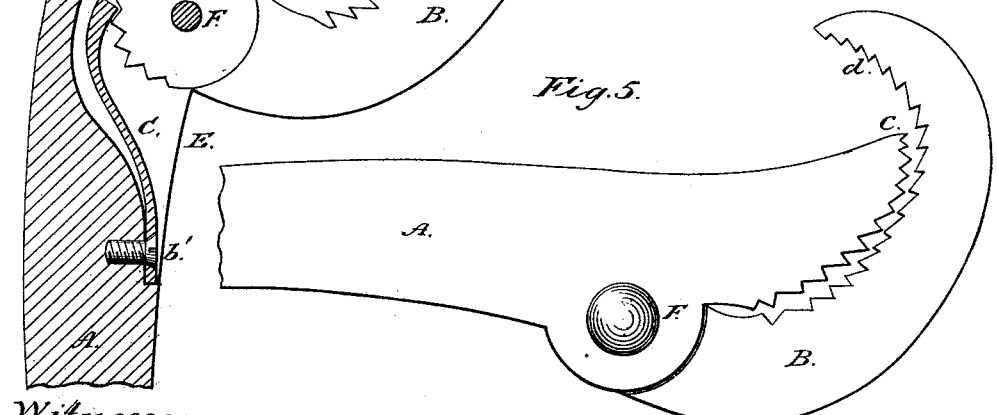
Witnesses:
H. S. Miller
C. F. Barrett
Inventor:
Eliezer Rees Mathews

UNITED STATES PATENT OFFICE.

ELIEZER R. MATHEWS, OF YOUNGSTOWN, OHIO.

IMPROVEMENT IN PIPE-WRENCHES.

Specification forming part of Letters Patent No. 189,567, dated April 17, 1877; application filed April 7, 1877.

*To all whom it may concern:*

Be it known that I, ELIEZER REES MATHEWS, civil and mining engineer, of Youngstown, Mahoning county, and State of Ohio, have invented new and useful Improvements for Pipe-Wrenches, of which the following is a specification:

The object of my invention is to simplify the construction, reduce the number of members, levers, and fixings required for a complete wrench, self-adjustable to all sizes of pipes or round rods of iron, or any other rods subject to be held tightened or screwed on or off any place, and by means of one hand only, if so required.

I carry out my object by the construction of a wrench composed of one lever or handle of any length or size, the wrench or screw end to be curved and toothed, also a mortise or hollow reception therein for a curved hook to be therein fastened by means of a bolt or rivet, said hook to be so curved and toothed to hold and screw any small or large size pipe or round iron, or any other round rods, by the use of a single lever and hook or additional hooks combined. A ratchet catch or spring can be attached to said lever in said reception or mortise, to regulate, hold, or adjust the said hook or hooks at any point required. One lever can be used for several hook or hooks to be applied thereto or exchanged for all sizes of pipes or rods.

The construction having been above briefly described, I shall more particularly describe the said wrench in detail hereunder, viz:

Figure 1 is a plan of the single lever separate from the hooks. Fig. 2 is a plan of the hooks Nos. 1 and 2, varying in sizes. Fig. 3 is a view of the ratchet catch or spring to regulate the hooks. Fig. 4 is a plan of the lever, ratchet-catch, and hook in open position. Fig. 5 is a plan of the lever, ratchet-catch, and hook in closed position.

A is the single lever, curved and toothed at $c$. B is the hook, curved and notched at $d$, with two-way notches, that permit the catch to pass both ways over them. C is the spring-catch, fastened by screw $b'$, through $b$ in a recess, E, of the lever A, and bearing against the ratchet D on the hook B. The lever A and hook B are attached by a bolt and nut, F G.

To operate the wrench, the lever and hook being in the relative position shown in Fig. 5, and the wrench being held with the hook B under lever A, a sudden jar or throw will throw the hook into the position shown in Fig. 4. The hook B is then placed over or under the pipe to be turned, and force is applied to the lever, which causes the spring C to pass over the teeth of the ratchet D toward the inner end of the ratchet, while the toothed end of the lever and hook approach each other to clasp the pipe. The pipe being clasped, the spring holds the hook in its clamped position against the pipe, and the wrench is supported on the pipe without being held by the hand. By reversing the direction of the force the spring recedes along the ratchet D in the toothed end of the hook, and the hook and lever are separated.

The wrench heretofore described is applicable to all and every size pipe or round rods of any metal by merely the use of one lever, which can be made to any size or length suitable for any class of work for plumbers, pipe-layers, or any other purpose. The ratchet-catch will serve to hold the wrench suspended to the pipe in any position by the weight of the wrench-handle.

I claim—

1. Two or more hooks, curved and toothed, of varying sizes, and adapted to be pivotally attached to the bar of the wrench, as and for the purpose set forth.

2. A hook having a two-way ratchet, in combination with a spring-catch attached to the bar of the wrench, as and for the purpose set forth.

In witness whereof I have hereunto set my hand this 23d day of March, A. D. 1877.

E. R. MATHEWS.

Witnesses:
WM. H. HOLSCHEEK,
H. V. WHEELER.